No. 783,931. PATENTED FEB. 28, 1905.
J. M. COUPER.
ORE SEPARATOR.
APPLICATION FILED MAR. 8, 1904.

Witnesses
C. D. Kesler
James L. Norris, Jr.

Inventor
James M. Couper
By James L. Norris
Atty.

No. 783,931.                                              Patented February 28, 1905.

UNITED STATES PATENT OFFICE.

JAMES M. COUPER, OF ATLANTA, GEORGIA.

ORE-SEPARATOR.

SPECIFICATION forming part of Letters Patent No. 783,931, dated February 28, 1905.

Application filed March 8, 1904. Serial No. 197,161.

*To all whom it may concern:*

Be it known that I, JAMES M. COUPER, a citizen of the United States, residing at Atlanta, in the county of Fulton and State of Georgia, have invented new and useful Improvements in Ore-Separators, of which the following is a specification.

This invention relates to what I shall for convenience term an "ore-separator." As intimated, this term is used simply for convenience, as the device may be used equally well in many other connections without changing its basic principles. What I consider to be new will be embraced by the claims succeeding the following description. In such description I will set forth in detail one simple adaptation of the invention which I have found wholly satisfactory for my purposes and which is clearly illustrated in the accompanying drawings, forming a part of this specification; but it is to be understood that I do not limit myself to the disclosure thus made, for material changes respecting certain structural and like points may be adopted within the scope of my claims.

For the purpose of indicating the many advantages of the apparatus hereinafter set forth I shall describe said apparatus as employed for separating gold or other precious metals from their ores. As hereinbefore indicated, however, the apparatus may be used for separating clays, &c., from foreign matter. For example, I am enabled effectively to separate sand and yellow ocher.

While, as stated, I do not limit myself to the particular organization hereinafter described, at the same time I do not wish to restrict myself to the association in the apparatus of all the parts involved in the said description, for in some cases one or more of said parts may be dispensed with.

Figure 1:
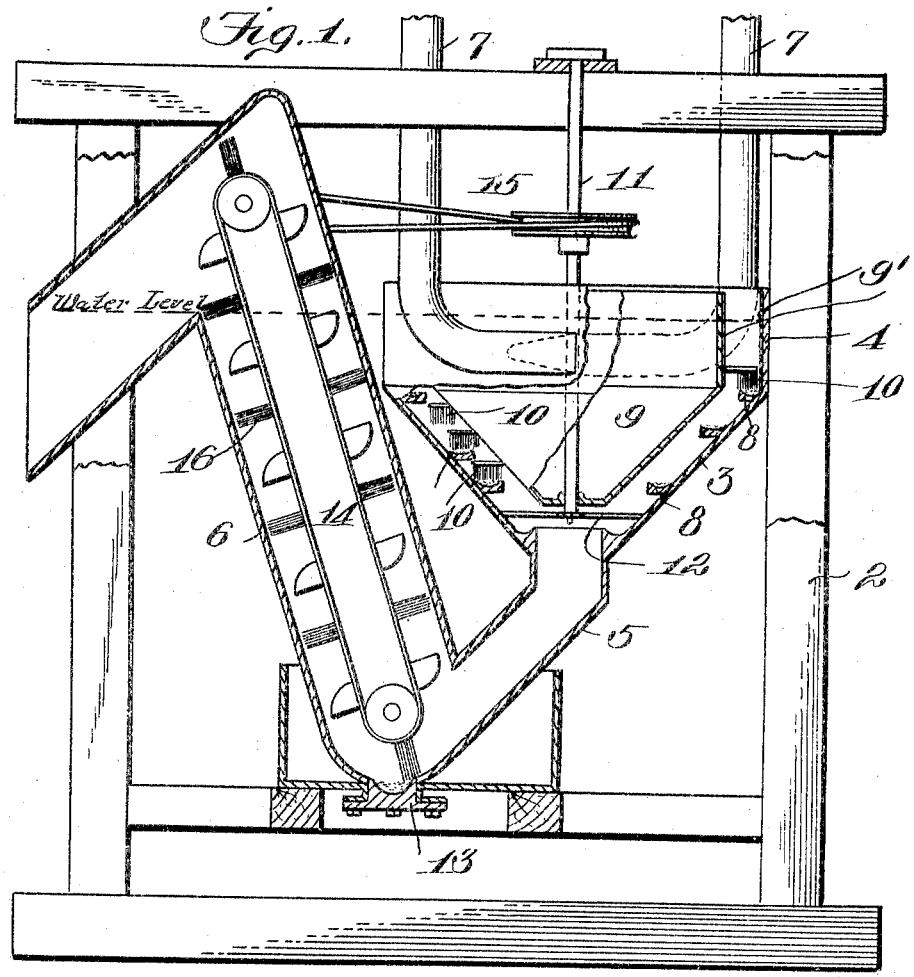
Figure 2:
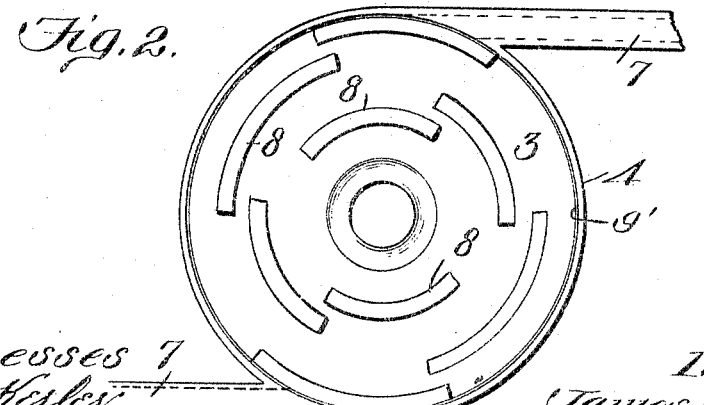

Referring to the drawings, Figure 1 is a sectional elevation of an apparatus including the invention. Fig. 2 is a detail plan view of the separating vessel.

Like characters refer to like parts in the several views.

The different parts of the apparatus may be supported by any suitable frame, that represented being denoted in a general way by 2. Said apparatus is shown as including in its make up an inverted substantially conical separating vessel, into which the mass to be treated is delivered, said vessel having a rim 4 at its top of substantially annular form and a concentric outlet which in the present instance is the bore of the delivery-tube 5, extending from the bottom of said vessel 3. This delivery-tube 5 is connected with the discharge-conduit 6, represented as an upwardly-inclined pipe, the discharge end of which is in the same horizontal plane as the supply opening or openings of the separating vessel 3. The mass of material to be separated in the vessel with water is charged into said vessel at a point above the outlet thereof, the precious metals or the like being caught during the downward traverse of the mass through said vessel, the refuse or non-separated portions or tailings, as the case may be, passing by way of the tubular extension 5 of the vessel into the pipe or discharge-conduit 6, in which latter they are elevated, and for this purpose, as will hereinafter appear, I provide means for positively securing the elevation in the conduit or discharge-pipe of such tailings or refuse.

The ore or other material after having been suitably crushed or otherwise initially treated is delivered into the separating vessel 3 at a place above the outlet thereof, and for this purpose said vessel has one or more inlets in the periphery thereof, through which by suitable pipes, as 7, the mass is supplied to said separating vessel. I have shown two inlets, and hence two supply-pipes 7. The said supply-pipes, it will be seen, are disposed approximately tangentially to the body of the separating vessel 3. I say approximately tangentially, for I do not wish to limit myself to the supply of the material to the vessel absolutely in a tangential direction to the periphery of such vessel, as I may secure the same advantageous results by directing the mass at an acute angle to such periphery.

Upon the inner surface of the inverted conical or funnel-shaped vessel 3 I fasten in some suitable manner riffles, plates, or equivalent devices, as 8, for catching the gold or other matter which it is desired to separate from the substance introduced into the vessel. In the case of precious metals these riffles are adapted to hold mercury, and in this event they will be made slightly concaved or channeled on their upper sides. The riffles constitute a simple and convenient means for catching the metal or other material that is to be separated. It will be seen that the riffles 8 are arranged in spiral stepped order. Therefore as the material to be treated is introduced at the side and near the top of the vessel in a liquid form at a tangent or an acute angle to the cone such material will be carried down through the cone with a rotary spiral motion, throwing the heavy matter to the sides. Hence the riffles will catch practically all of the gold or other precious metal that may be in the descending mass. By my invention, therefore, no float-gold can escape from the mass, as the latter is first projected downward and then upward with the float-gold and other gold always under water, and I find that the riffles arranged as described catch practically all of this gold, although I illustrate and will hereinafter describe means for catching any of the gold that may not be caught by said riffles. Such means involving an inner cone, as 9, and a receptacle, hereinafter described, arranged at a point beyond the lower terminal riffle 8. The inner cone 9 is separated or spaced a suitable distance from the complemental cone, and the descending body of liquid passes through this space, the inner cone serving to prevent undue lateral motion of the descending mass. In other words, the inner cone restrains the traveling body to such an extent that the latter is caused to pass directly over the several stepped riffles 8, so as to assure, as nearly as possible, said riffles catching all the heavy gold. At the upper portions and on the insides of the two cones I prefer to provide removable amalgam plates, each denoted by 9', or the adjacent surfaces of the two cones can be amalgamated at their upper portions to catch the light or float gold which remains on the surface of the water. The water of course rotates, so that by the amalgamated plates 9' or the amalgamated upper portions of the cones I capture all of the float-gold. Preferably the inner cone 9 is arranged for rotation, and I will hereinafter describe means for positively securing such motion, so that brushes, also to be hereinafter described, can receive motion from said cone, said brushes being utilized to sweep the riffles 8 free of foreign material to leave the said riffles exposed, as nearly as possible, for the reception and retention of the gold. This cone 9 is in the present case arranged to rotate in the same direction as the water which enters the separating cone or vessel 3.

The brushes for sweeping the riffles are denoted by 10, and their shanks or bodies may be secured in any desirable manner to the outer surface of the inner cone. Said inner cone is carried by a vertical shaft 11, stepped into the hub of a spider or skeleton support, as 12, supported within and by the outer cone 3 near the bottom thereof. Therefore on the movement of the inner cone the brushes 10 connected therewith will sweep the objectionable or refuse matter from the riffles 8, so that it can be carried downward through the outlet of the inner cone or separating vessel by the force of the downwardly-moving mass therein. This inner and rotative cone may be driven with an elevator, as will hereinafter appear.

At the junction of the pipe 6 and separating vessel 3 I arrange the removable trap or vessel 13, the body of the trap closing in a water-tight manner an opening in the discharge-pipe 6, which pipe, as will hereinafter appear, constitutes a casing for an elevator. This trap 13 may be suitably secured in place—as, for example, by means of bolts—whereby it can at intervals be dismounted in order to remove an accumulation of gold which may be caught thereon, said trap being in practice made of concaved or dished form on its upper side to receive quicksilver to secure the result in question.

The discharge-pipe 6, as hereinbefore stated, constitutes a casing or housing for an elevator, as 14, which is shown as being of the endless type, the belt or apron thereof having a plurality of cups or buckets on its outer side to receive the tailings or refuse which pass from the separating vessel 3, said tailings or refuse being delivered by the said elevator cups or buckets through the discharge-opening in the upper side of the pipe 6. The discharge, as previously indicated, is about on the level at which the mass comprising the water and ore is introduced into the separating vessel. For simplicity I prefer to connect the elevator 14 and rotative cone 9, showing belt-power-transferring mechanism (denoted in a general way by 15) for this purpose. Either the cone or elevator may be directly driven, as may be desired, and the directly-driven part will serve, through the interposition of the belting, to actuate the other part. The outer surface of the belt or apron constituting part of the elevator 14 is equipped between the cups thereof with brushes, as 16, which brushes are adapted on the movement of the elevator to stir up the material upon the trap or receptacle 13. They also prevent the incrustation of foreign matter on the quicksilver in such trap or receptacle in order that any gold that may not have been caught by the riffles or outer surface of the cone 9 will be precipitated into such quicksilver.

I have not shown any means for delivering the mass to be separated into the supply-pipes 7. The same may be of any desirable character.

From the foregoing description it will be obvious that I introduce the material to be treated at the top of the separating-receptacle or vessel and work it down and then bring it back up to about the level of its introduction, or practically so. The light or float gold upon being introduced into the separating-receptacle is revolved with the material between the amalgam plate on the inside of the outer cone and the amalgam plate on the outside of the inner cone, being brought into contact with one or the other and captured. The heavy gold descends and by the rotary action of the water is thrown to the side of the outer cone and deposited in the riffle. Should it escape these riffles and reach the bottom of the discharge-pipe, which is the bottom of the elevator-casing, it finds a receptacle of quicksilver to receive it. The heavy gold cannot ascend with the water and light material, therefore must remain at the bottom of this elevator-casing.

By my improved organization I am enabled to recover or capture practically all the precious particles in the mass of pulp introduced into the apparatus. The apparatus involves an inverted substantially conical vessel having an outlet below its top, a pipe leading from said outlet, the discharge end of the pipe being substantially at the level at which the pulp or similar material is introduced into said vessel, whereby the water which is in the pulp is maintained at a substantially fixed or predetermined level in the vessel, while at the same time a regular discharge is provided for without the necessity of employing valves or other extraneous means. In connection with the vessel mentioned I provide a second vessel therein, which is preferably rotative and is provided with gold-catching means of some suitable nature. The outer vessel has been hereinbefore described as provided upon its inner surface with gold-catching means, while gold catching or recovering means is situated at approximately the outlet of the outer vessel, the last-mentioned gold-catching means, which ordinarily consists of a quicksilver-containing trap, serving to receive the gold concentrated upon that point by the action of the water and gravity. The pulp is introduced into the outer or concentrating vessel proper tangentially thereof, whereby it is given a rotary or spiral downward action. As the water is maintained at a substantially uniform level in the concentrating or outer vessel, I am enabled to catch the float-gold therein, and for this purpose means for recovering such float-gold are located approximately at the upper portion of the body of water.

Having thus described my invention, what I claim, and desire to secure by Letters Patent, is—

1. An inverted substantially conical vessel having an outlet below its top, means for introducing pulp into the vessel tangentially thereof and above said outlet, a pipe leading from said outlet, and the delivery end of which is located substantially at the same level as that at which the pulp is introduced into said vessel, and means for catching gold or the like, associated with said vessel.

2. An inverted substantially conical vessel having an outlet below its top, means for introducing pulp into said vessel tangentially thereof and above said outlet, a pipe leading from said outlet, the delivery end of which is located substantially at the same level as that at which the pulp is introduced into said vessel, means for catching gold, situated in the vessel at about the level of the water therein, and gold-catching means located substantially at the junction of said outlet and pipe.

3. An inverted substantially conical vessel having an outlet below its top, means for introducing pulp into said vessel tangentially thereof and above said outlet, a pipe leading from said outlet, the delivery end of which is located at about the level of that at which the pulp is introduced into said vessel, means for catching gold, situated in the vessel at about the level of the water therein, riffles on the inner side of said vessel for catching the precious particles in the downwardly-moving mass, and gold-catching means located substantially at the junction of said outlet and pipe.

4. An inverted substantially conical vessel having an outlet below its top, means for supplying pulp into said vessel approximately tangentially thereof and above said outlet, a pipe leading from said outlet, the delivery end of which is located substantially at the same level as that at which the pulp is introduced into said vessel, gold-capturing means associated with said vessel, and a rotary member in said vessel, provided with means for catching the float-gold in the water in said vessel.

5. An inverted substantially conical vessel having an inlet and an outlet below its top, means for supplying pulp, through said inlet, into said vessel tangentially of the latter, and a pipe leading from said outlet, the delivery end of the pipe being situated substantially at the same level as that at which the pulp is introduced into said vessel.

6. An inverted substantially conical vessel having an outlet below its top, a pipe leading from said outlet, having an upward direction, means for supplying water and ore into said vessel approximately tangentially thereof and above said outlet, means for separating the precious metals from the ore during the downward movement of the mass, and a second rotative conical vessel in the other conical vessel, said second rotative conical vessel having its outer surface amalgamated.

7. An inverted substantially conical vessel having an outlet below its top, a pipe leading from said outlet, having an upward direction, means for supplying water and ore into said vessel approximately tangentially thereof and above said outlet, riffles on the inner side of said vessel for catching the precious particles in the downwardly-moving mass, and a second conical vessel within said other vessel, having brushes connected therewith and adapted to sweep said riffles.

8. An inverted substantially conical vessel having an outlet below its top, an upwardly-inclined pipe leading from said outlet, means for directing water and ore into said vessel approximately tangentially thereof and above said outlet, means for catching the precious particles in the downwardly-moving mass, an elevator in said pipe for carrying off the tailings or refuse, a second conical and exteriorly-amalgamated vessel rotatively mounted in the other conical vessel, and power-transmitting connections between the second conical vessel and elevator.

9. An inverted substantially conical vessel having an outlet below its top, a pipe leading from said outlet, having an upward direction, means for simultaneously delivering water and ore into said vessel approximately tangentially thereof at a common point and above said outlet, means in the vessel for catching precious particles in the downwardly-moving mass, and means located approximately at the junction of the pipe and vessel for also catching such precious particles.

10. An inverted substantially conical vessel having an outlet below its top, a pipe leading from said outlet, having an upward inclination, means for delivering water and ore into said vessel approximately tangentially thereof and above said outlet, means for catching the precious particles in the downwardly-moving mass, a quicksilver-receptacle substantially at the junction of the pipe and vessel, and an elevator in the pipe, having means for clearing said quicksilver-receptacle of objectionable matter.

11. An inverted substantially conical vessel having an outlet below its top, an upwardly-inclined pipe leading from said outlet, means for directing water and ore into said vessel approximately tangentially thereof and above said outlet, riffles on the inner side of said conical vessel, a second conical vessel mounted rotatively in the other one and provided with brushes for sweeping said riffles clear of objectionable matter, a quicksilver-receptacle located substantially at the junction of said pipe and first-mentioned conical vessel, and an elevator in said pipe for carrying off the objectionable matter, said elevator being provided with brushes for sweeping the quicksilver-receptacle free of such objectionable matter.

12. A separating vessel of substantially inverted conical form, having an inlet, and an approximately similarly shaped part within and separated from said vessel, the adjacent faces of the two parts being amalgamated at a place substantially in line with said inlet, said vessel having an outlet below and separated from the amalgamated portion thereof, and a pipe leading from said outlet, the delivery end of the pipe being substantially in the same horizontal plane with said inlet.

13. An inverted substantially conical vessel having an outlet below its top, means for introducing pulp into the vessel, tangentially thereof and above said outlet, a pipe leading from said outlet, the delivery end of which is located at substantially the same level as that at which the pulp is introduced into said vessel, means on the inner surface of said vessel for capturing gold, independent means located approximately at said outlet for capturing gold precipitated by the downflowing mass in said vessel, and means for recovering the float-gold in the upper part of the body of water in said vessel.

14. An inverted substantially conical vessel having an outlet below its top, means for introducing pulp into the vessel tangentially thereof and above said outlet, a pipe leading from said outlet, the delivery end of which is located substantially at the same level as that at which the pulp is introduced into said vessel, a rotary member in said vessel, provided with means for catching the float-gold in the water in said vessel, gold-catching means upon the wall of said vessel, and gold-catching means situated approximately at the outlet of said vessel.

In testimony whereof I have hereunto set my hand in presence of two subscribing witnesses.

JAMES M. COUPER.

Witnesses:
   JOHN F. METHVIN,
   J. M. BISHOP.